(12) United States Patent
Aoki et al.

(10) Patent No.: US 10,824,178 B2
(45) Date of Patent: Nov. 3, 2020

(54) HEATING AND HOT WATER SUPPLY APPARATUS AND CONTROL METHOD THEREOF

(71) Applicant: NORITZ CORPORATION, Hyogo (JP)

(72) Inventors: Isao Aoki, Hyogo (JP); Yoshiro Nishiyama, Hyogo (JP); Toshiya Tatsumura, Hyogo (JP); Yoshikazu Kato, Hyogo (JP); Yuki Nakajima, Hyogo (JP); Takuto Matsuoka, Hyogo (JP); Hidetsugu Okada, Hyogo (JP); Sachiko Tachibana, Hyogo (JP); Masanori Yamashita, Hyogo (JP); Takahiro Maeda, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 254 days.

(21) Appl. No.: 15/964,022

(22) Filed: Apr. 26, 2018

(65) Prior Publication Data

US 2018/0314275 A1 Nov. 1, 2018

(30) Foreign Application Priority Data

Apr. 27, 2017 (JP) .................................. 2017-088225

(51) Int. Cl.
*G05D 23/13* (2006.01)
*F24D 19/10* (2006.01)
(Continued)

(52) U.S. Cl.
CPC ..... *G05D 23/1353* (2013.01); *F24D 19/1051* (2013.01); *F24H 9/2035* (2013.01);
(Continued)

(58) Field of Classification Search
CPC .................................................. F24D 19/1051
See application file for complete search history.

(56) References Cited

U.S. PATENT DOCUMENTS

2011/0000444 A1* 1/2011 Min ...................... F24D 3/1008
 122/14.1
2011/0017152 A1* 1/2011 Min ......................... F24D 3/08
 122/19.1

(Continued)

FOREIGN PATENT DOCUMENTS

JP 2005337632 A * 12/2005
JP 2006-10284 1/2006

OTHER PUBLICATIONS

JP2005337632A—machine translation (Year: 2005).*

*Primary Examiner* — Nathaniel Herzfeld
(74) *Attorney, Agent, or Firm* — JCIPRNET

(57) ABSTRACT

The disclosure provides a heating and hot water supply apparatus which includes a heating circulation path configured to circulate a heated heating medium with a heating terminal, and a bypass path branched from the heating circulation path for causing the heating medium to flow therethrough without passing through the heating terminal. A hot water supply heat exchanger is disposed in the bypass path. A division ratio of the heating medium from the heating circulation path to the bypass path is controlled by a distribution valve. The division ratio is increased from a first value to a second value when a reservation preheat control is started during the heating operation according to a start reservation time of hot water supply operation reserved by a timer, and set to a third value greater than the second value during a simultaneous operation of the hot water supply and the heating operation.

6 Claims, 7 Drawing Sheets

(51) Int. Cl.
*F24H 9/20* (2006.01)
*G05D 23/19* (2006.01)
(52) U.S. Cl.
CPC ..... *G05D 23/1333* (2013.01); *G05D 23/1366* (2013.01); *G05D 23/1927* (2013.01); *F24D 2220/042* (2013.01); *F24D 2240/12* (2013.01)

(56) References Cited

U.S. PATENT DOCUMENTS

| | | | | |
|---|---|---|---|---|
| 2011/0289952 | A1* | 12/2011 | Kim | F24D 11/0214 62/189 |
| 2015/0204550 | A1* | 7/2015 | Deivasigamani | F24D 19/1069 237/2 A |
| 2015/0300661 | A1* | 10/2015 | Park | F24H 1/523 237/8 R |

* cited by examiner

| | Heating pump | Circulation pump | Distribution valve |
|---|---|---|---|
| Heating operation | ON | (ON) | Entire amount flows to heating circulation path (kd=0) |
| Hot water supply operation | OFF | ON | Entire amount flows to bypass path (kd=1.0) |
| Simultaneous operation | ON | (ON) | $k = kb$ $(0 < kb < 1.0)$ |
| (During heating operation) Reservation preheat control | ON | (ON) | $k = ka$ $(0 < ka < kb > 1.0)$ |

HEATING AND HOT WATER SUPPLY APPARATUS AND CONTROL METHOD THEREOF

CROSS-REFERENCE TO RELATED APPLICATION

This application claims the benefit of Japanese Application Serial No. 2017-088225, filed on Apr. 27, 2017. The entirety of the above-mentioned patent application is hereby incorporated by reference herein and made a part of this specification.

BACKGROUND

Technical Field

The disclosure relates to a heating and hot water supply apparatus and a control method thereof, and particularly, to a heating and hot water supply apparatus having both a heating function and a hot water supply function, and a control method thereof.

Related Art

As one aspect of a hot water supply apparatus, a configuration in which low temperature water is heated by heat exchange with a liquid phase heating medium is used. For example, Japanese Patent Application Laid-open No. 2006-10284 discloses a configuration in which a preheating water circulation circuit is provided in a heat pump water heater having a heat exchanger which heats water by a refrigerant of a heat pump circuit so that hot water supply can be promptly started without a hot water storage tank.

As another aspect of the hot water supply apparatus, an apparatus which has a function of heating by passing a heating medium through a circulation path formed with a heating device and also has a function of supplying hot water by branching a bypass path including a hot water supply heat exchanger from the circulation path (hereinafter, also referred to as a heating and hot water supply apparatus) is used. In the heating and hot water supply apparatus as described above, it is possible to simultaneously exhibit the heating function and the hot water supply function by passing a part of the heating medium through each of the circulation path and the bypass path.

However, in the heating and hot water supply apparatus, when hot water supply is started from a state in which the heating medium does not flow through the bypass path, it takes time to raise a hot water outlet temperature to a set temperature. Meanwhile, introducing the heating medium into the bypass path at the time of turning off the hot water supply contributes to prompt hot water supply but causes a decrease in energy efficiency. In particular, during a heating operation, heating capacity may be reduced by supplying the heating medium into the bypass path.

An aspect of the disclosure is to promptly raise a hot water outlet temperature at the start of use of hot water supply without excessively lowering heating capacity during a heating operation of a heating and hot water supply apparatus having a heating function and a hot water supply function.

SUMMARY

In one aspect of the disclosure, a heating and hot water supply apparatus includes a heating mechanism for heating a heating medium, a heating circulation path, a hot water supply heat exchanger, a bypass path, a water inlet pipe, a hot water outlet pipe, an input unit for inputting a start reservation time of a hot water supply operation, and a control unit for controlling a flow rate control mechanism according to ON and OFF of a heating operation and a hot water supply operation. The heating circulation path is formed to circulate the heating medium heated by the heating mechanism with a heating terminal when a heating operation is performed. The hot water supply heat exchanger has a primary side path and a secondary side path for heat exchange between liquids. The bypass path is branched from the heating circulation path and is formed to join the heating circulation path again after causing the heating medium to flow through the primary side path of the hot water supply heat exchanger without passing through the heating terminal. The flow rate control mechanism controls a division ratio which is a ratio of a flow rate of the heating medium supplied to the bypass path to a total flow rate of the heating medium heated by the heating mechanism. The water inlet pipe is connected to an input side of the secondary side path. The hot water outlet pipe is connected to an output side of the secondary side path. The control unit controls the flow rate control mechanism to set the division ratio to a first value when only the heating operation is performed and to set the division ratio to a second value greater than the first value when a preheating start time set according to the start reservation time arrives during performance of only the heating operation. Further, the control unit also controls the flow rate control mechanism to set the division ratio to a third value greater than the second value during a simultaneous operation of the heating operation and the hot water supply operation and to set the division ratio to a fourth value greater than the third value when only the hot water supply operation is performed.

According to another aspect of the disclosure, in a method of controlling a heating and hot water supply apparatus, the heating and hot water supply apparatus includes a heating circulation path configured to circulate a heating medium heated by a heating mechanism with a heating terminal, and a hot water supply heat exchanger disposed in a bypass path branched from the heating circulation path and configured to join the heating circulation path again without passing through the heating terminal. The control method includes receiving an input of a start reservation time of a hot water supply operation, and increasing a division ratio in stages when use of hot water supply is started after the start reservation time during a heating operation in which the division ratio of the heating medium from the heating circulation path to the bypass path is set to a first value. More specifically, the increasing of the division ratio includes increasing the division ratio from the first value to a second value when a preheating start time set according to the start reservation time arrives, and increasing the division ratio from the second value to a third value according to start of use of hot water supply.

DESCRIPTION OF THE EMBODIMENTS

Figure 1:
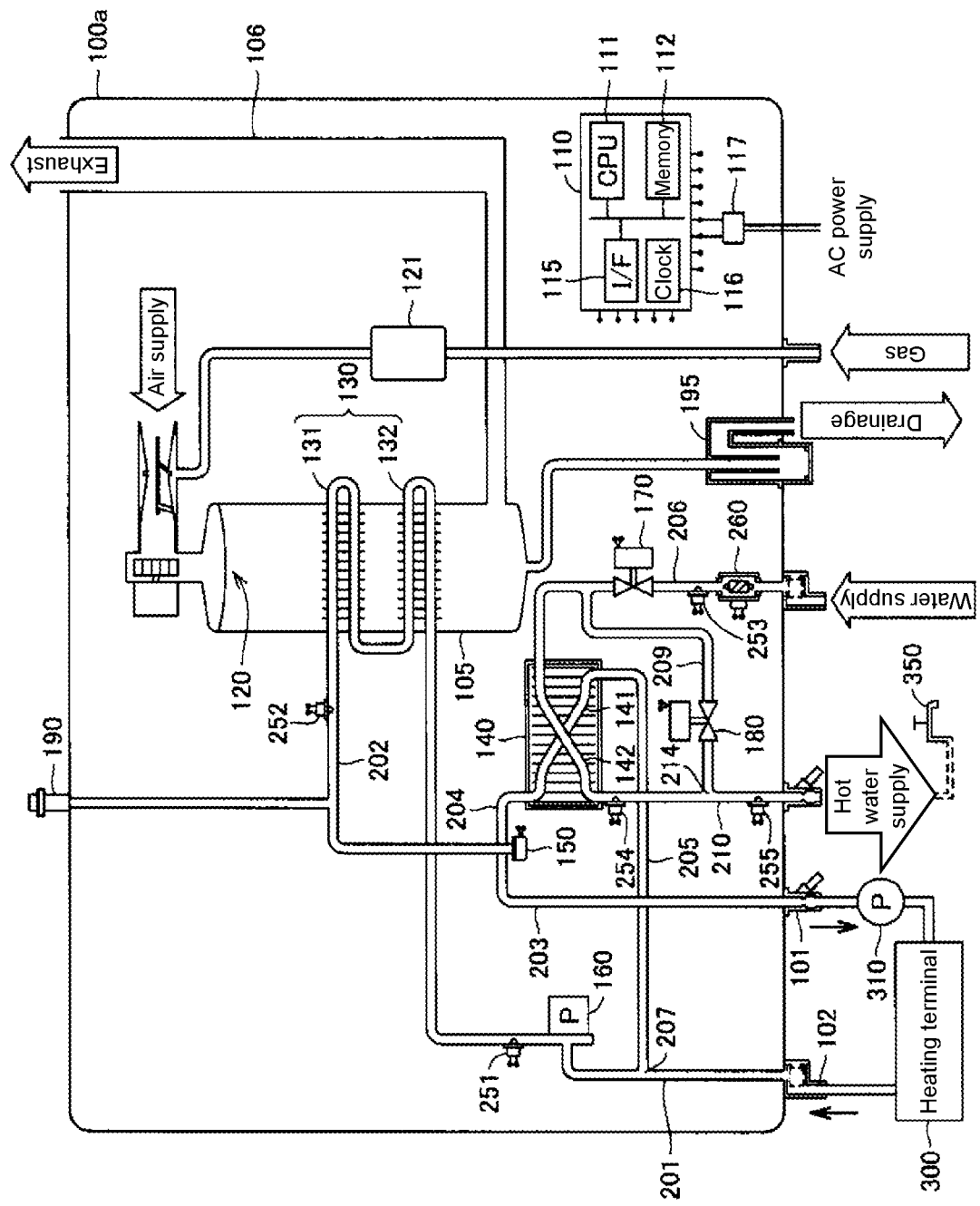
FIG. 1 is a block diagram illustrating a configuration of a heating and hot water supply apparatus according to a first embodiment.

According to the heating and hot water supply apparatus, a hot water outlet temperature can be raised early at the start of the hot water supply by reservation preheat control in which the heating medium in the bypass path including the hot water supply heat exchanger flows according to the start reservation time of the hot water supply operation. Further, when the reservation preheat control is performed during the heating operation, the division ratio to the bypass path is set to be lower than that in the simultaneous operation of the heating and the hot water supply, and thus deterioration of heating capacity can be minimized.

The heating and hot water supply apparatus may further include a first temperature sensor provided in the water inlet pipe. The control unit may increase the second value as a temperature difference between a set hot water supply temperature in the hot water supply operation and a detected temperature of the first temperature sensor increases.

According to such a configuration, due to variable setting of the division ratio to the bypass path when the reservation preheat control is performed during the heating operation, it is possible to quickly increase a hot water outlet temperature at the start of the hot water supply even when a temperature of water introduced into the hot water supply heat exchanger from the water inlet pipe is low.

Further, the heating and hot water supply apparatus may further include a second temperature sensor. The second temperature sensor may be disposed on the output side of the primary side path of the hot water supply heat exchanger in the bypass path. The control unit may reduce the division ratio to be below the second value when a detected temperature of the second temperature sensor becomes higher than a predetermined determination temperature under a condition that the division ratio is the second value.

Due to such a configuration, excessive supply of the heating medium to the hot water supply heat exchanger in the reservation preheat control during the heating operation can be minimized, and deterioration of energy efficiency and heating capacity can be further minimized.

More specifically, the increasing of the division ratio includes increasing the division ratio from the first value to a second value when a preheating start time set according to the start reservation time arrives, and increasing the division ratio from the second value to a third value according to start of use of hot water supply.

According to the method of controlling the heating and hot water supply apparatus, the hot water outlet temperature can be increased early at the start of the hot water supply by the reservation preheat control in which the heating medium in the bypass path including the hot water supply heat exchanger flows according to the start reservation time of the hot water supply operation. Further, when the reservation preheat control is performed during the heating operation, since the division ratio to the bypass path is set to be lower than that during the simultaneous operation of the heating and the hot water supply, it is possible to minimize deterioration of the heating capacity.

According to the disclosure, it is possible to promptly raise the hot water outlet temperature at the start of use of the hot water supply without excessively lowering heating capacity during the heating operation of the heating and hot water supply apparatus having the heating function and the hot water supply function.

Hereinafter, embodiments of the disclosure will be described in detail with reference to the drawings. Further, in the following description, the same or corresponding parts in the drawings are designated by the same reference numerals, and description thereof will not be repeated in principle.

First Embodiment

FIG. 1 is a block diagram illustrating a configuration of a heating and hot water supply apparatus according to a first embodiment.

Referring to FIG. 1, the heating and hot water supply apparatus 100a according to the first embodiment includes an output end 101 and an input end 102 connected to a heating terminal 300, a water inlet pipe 206 into which low temperature water such as tap water is introduced, and a hot water outlet pipe 210 which supplies hot water to a hot water supply tap 350. In the heating and hot water supply apparatus 100a, a heating function is realized by supplying a heating medium (high temperature water) to the heating terminal 300 via the output end 101 and the input end 102. Further, a hot water supply function from the hot water outlet pipe 210 is realized by heating low temperature water introduced into the water inlet pipe 206 through heat exchange with the heating medium.

First, a configuration related to the heating function of the heating and hot water supply apparatus 100a will be mainly described. The heating and hot water supply apparatus 100a further includes a can body 105 in which a combustion burner 120 and a heat exchanger 130 are accommodated, an exhaust pipe 106, a controller 110, a hot water supply heat exchanger 140, a distribution valve 150, a circulation pump 160, and pipes 201 to 205.

The combustion burner 120 receives supply of fuel represented by gas and generates an amount of heat by combustion of the fuel. The fuel is supplied to the combustion burner 120 via a flow rate control valve 121. A flow rate of gas supplied to the combustion burner 120, that is, the amount of heat generated in the combustion burner 120, can be controlled by adjusting an opening degree of the flow rate control valve 121.

The heat exchanger 130 includes a primary heat exchanger 131 which heats a fluid mainly by sensible heat of fuel combustion in the combustion burner 120, and a secondary heat exchanger 132 which heats the fluid mainly by latent heat of exhaust gas from the fuel combustion.

The combustion exhaust gas generated by combustion of the combustion burner 120 is exhausted to the outside of the heating and hot water supply apparatus 100a via the exhaust pipe 106. Further, in the secondary heat exchanger 132, acid water (drainage) produced by the combustion exhaust gas being cooled and condensed by heat exchange for recovery of latent heat is neutralized, collected in a drainage tank 195 and then exhausted to the outside of the heating and hot water supply apparatus 100a.

The input end 102 to which the heating medium passing through the heating terminal 300 is input is connected to an input side of the secondary heat exchanger 132 by the pipe 201. An output side of the primary heat exchanger 131 is connected to the pipe 202. The pipe 202 is connected to the pipes 203 and 204 via the distribution valve 150. The pipe 203 is connected to the output end 101 for outputting the heating medium to the heating terminal 300. The pipe 204 is connected to an input side of a primary side path 141 of the hot water supply heat exchanger 140. An output side of the primary side path 141 of the hot water supply heat exchanger 140 is connected to the pipe 201 by the pipe 205.

The opening degree of the distribution valve 150 is controlled by the controller 110. A ratio of a flow rate of a path from the pipe 202 to the pipe 203 to a flow rate of a path from the pipe 202 to the pipe 204 can be controlled according to the opening degree of the distribution valve 150.

The heating terminal 300 and a heating pump 310 are connected between the output end 101 and the input end 102. As the heating pump 310 is operated, a "heating circulation path" for circulating the heating medium with the heating terminal 300 is formed between the output end 101 and the input end 102 inside the heating and hot water supply apparatus 100a. The heating circulation path includes the pipe 201, the heat exchanger 130, the pipe 202, the distribution valve 150, and the pipe 203. For example, the heating medium is high temperature water heated by the amount of heat generated by the combustion burner 120 in the heat exchanger 130. That is, the combustion burner 120 and the heat exchanger 130 correspond to an embodiment of a "heating mechanism."

A space (room) in which the heating terminal 300 is disposed can be heated by supplying the heating medium to the heating terminal 300. That is, the heating and hot water supply apparatus 100a can realize the heating function by heating the heating medium flowing through the heating circulation path formed by the operation of the heating pump 310.

A pressure relief valve 190 is further provided in the heating circulation path. Further, although not illustrated, the heating circulation path is further connected with a circuit for replenishing with tap water or the like when the heating medium decreases.

A bypass path branched from the heating circulation path for the heating medium heated by the heat exchanger 130 can be formed by introducing the heating medium into the pipe 204 through the distribution valve 150. The bypass path includes the pipe 204, the primary side path 141 of the hot water supply heat exchanger 140, and the pipe 205. The heating medium flowing through the bypass path flows through the hot water supply heat exchanger 140 (primary side path 141) without passing through the heating terminal 300 and is then joined into the heating circulation path at a connection point 207 of the pipes 201 and 205.

The circulation pump 160 is disposed downstream of the connection point 207 (on a side of the heat exchanger 130) in the pipe 201. Therefore, when the circulation pump 160 is operated, the bypass path for allowing the heating medium to flow through the heat exchanger 130 and the hot water supply heat exchanger 140 can be formed even though the heating circulation path is not formed due to the operation of the heating pump 310.

A ratio of a supply flow rate to the heating circulation path to a supply flow rate to the bypass path for the heating medium heated by the heat exchanger 130 can be controlled according to the opening degree of the distribution valve 150. Hereinafter, a ratio of the supply flow rate to the bypass path to a total flow rate of the heating medium output from the heat exchanger 130 is also referred to as a distribution ratio kd. A distribution ratio kr is controlled between kd=0 (that is, a total amount of heating medium flows through the heating circulation path) and kd=1.0 (that is, the total amount of heating medium flows through the bypass path) (0≤kd≤1.0). That is, the distribution valve 150 corresponds to one embodiment of a "flow rate control mechanism."

Next, a configuration which is connected to a secondary side path 142 of the hot water supply heat exchanger 140 related to the hot water supply function of the heating and hot water supply apparatus 100a will be described.

The heating and hot water supply apparatus 100a includes a bypass pipe 209, a flow rate regulation valve 170, and a bypass flow rate valve 180 in addition to the water inlet pipe 206 and the hot water outlet pipe 210.

When the hot water supply tap 350 opens, low temperature water is introduced from the water inlet pipe 206 due to a water pressure of tap water or the like. The water inlet pipe 206 is connected to an input side of the secondary side path 142 of the hot water supply heat exchanger 140. The hot water outlet pipe 210 is connected to an output side of the secondary side path 142 of the hot water supply heat exchanger 140. In the hot water supply heat exchanger 140, the low temperature water flowing through the secondary side path 142 is heated by an amount of heat of the heating medium flowing through the primary side path 141. As a result, high temperature water is output from the secondary side path 142 to the hot water outlet pipe 210.

The bypass pipe 209 is disposed between the water inlet pipe 206 and the hot water outlet pipe 210 to form the bypass path of the hot water supply heat exchanger 140. A junction 214 with the bypass pipe 209 is provided in the hot water outlet pipe 210. Additionally, appropriate temperature hot water in which the high temperature water heated by the hot water supply heat exchanger 140 and the low temperature water having passed through the bypass pipe 209 are mixed is supplied from the hot water outlet pipe 210 to the hot water supply tap 350 or the like.

The bypass flow rate valve 180 is disposed in the bypass pipe 209. A ratio of a flow rate of the bypass pipe 209 to a flow rate of water entering the water inlet pipe 206, that is, a mixing ratio of the high temperature water and the low temperature water, is controlled according to an opening degree of the bypass flow rate valve 180.

The flow rate regulation valve 170 can be disposed in the water inlet pipe 206. For example, during a period when heating capacity is insufficient immediately after start of the hot water supply, a decrease in a hot water outlet temperature may be prevented by controlling an opening degree of the flow rate regulation valve 170 to reduce a hot water outlet flow rate. Further, even when it is not immediately after the start of the hot water supply, the hot water outlet flow rate can be reduced by controlling the opening degree of the flow rate regulation valve 170 in order to discharge hot water according to a set hot water supply temperature at the time of high flow rate.

A temperature sensor 251 for detecting an input temperature Tin of the heating medium to the heat exchanger 130 in the heating circulation path is provided in the pipe 201. A temperature sensor 252 for detecting an output temperature Thm of the heating medium heated by the heat exchanger 130 is disposed in the pipe 202. Further, in connection with the hot water supply function, a temperature sensor 253 for detecting a temperature Tw of the low temperature water introduced into the water inlet pipe 206 is provided. A temperature sensor 254 for detecting a high temperature water temperature Th is disposed on the output side of the secondary side path 142 of the hot water supply heat exchanger 140. Further, a temperature sensor 255 for detecting a hot water outlet temperature To after the high temperature water and the low temperature water are mixed is disposed on a downstream side of the junction 214 of the hot water outlet pipe 210.

The controller 110 is operated by receiving a power supply voltage (for example, DC 15 V) from a power supply circuit 117. The power supply circuit 117 converts electric power from an external power supply (for example, a commercial AC power supply) of the heating and hot water supply apparatus 100a into a power supply voltage.

The controller 110 has a central processing unit (CPU) 111, a memory 112, an interface 115, and a clock unit 116. The clock unit 116 allows the controller 110 to detect a date and time. The controller 110 controls an operation of each device by executing a program stored in advance in the memory 112 so that the heating and hot water supply apparatus 100a is operated according to a user's operation command.

Figure 2:
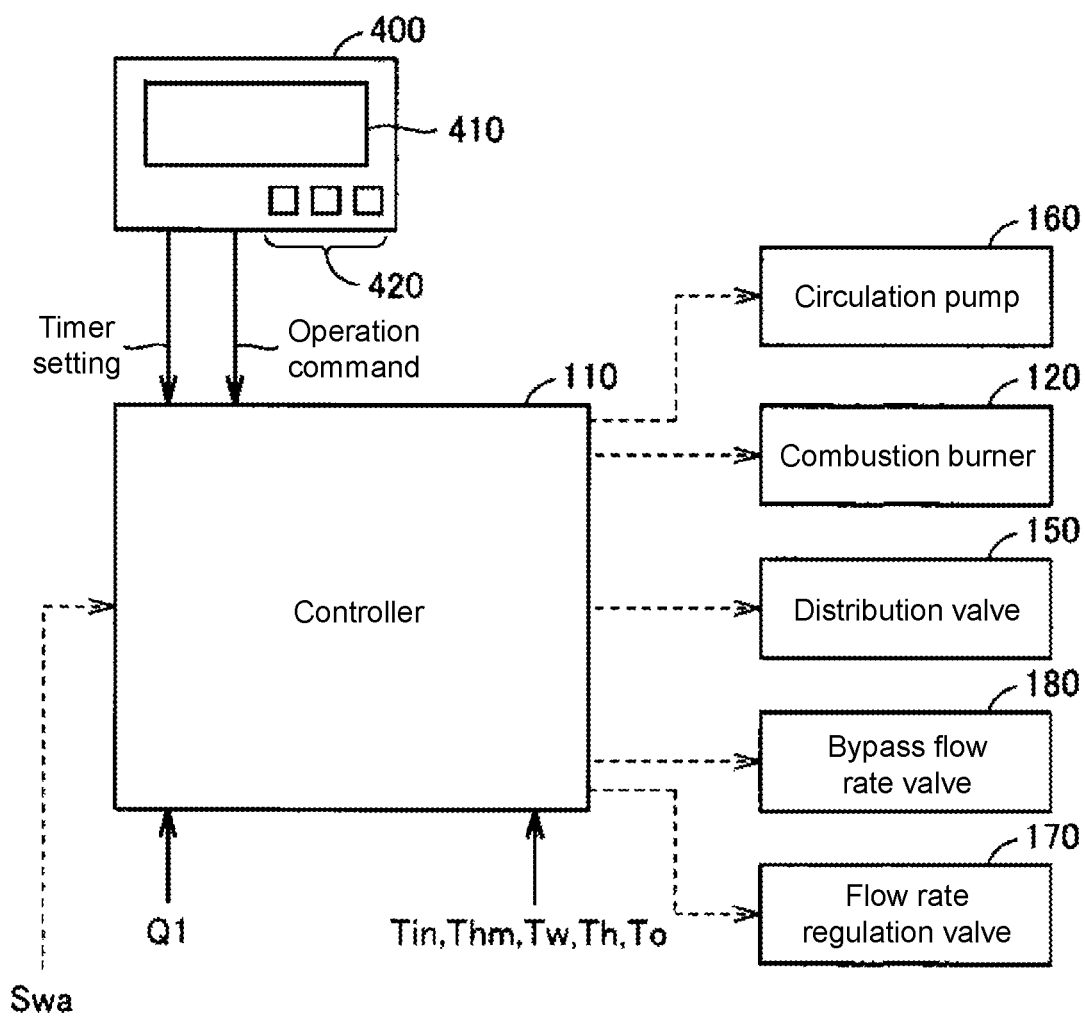
FIG. 2 is a functional block diagram illustrating operation control of the heating and hot water supply apparatus by a controller illustrated in FIG. 1.

FIG. 2 illustrates a functional block diagram illustrating operation control of the heating and hot water supply apparatus 100a by the controller 110.

Referring to FIG. 2, the controller 110 is connected to a remote controller (hereinafter, simply referred to as a "remote") 400 of the heating and hot water supply apparatus 100a by a communication line (for example, a two-wire communication line). Bidirectional communication is possible between the remote 400 and the controller 110.

A display unit 410 and an operation unit 420 are provided in the remote 400. A user can input an operation command of the heating and hot water supply apparatus 100a using the operation unit 420. The operation command includes an operation ON/OFF command of the heating and hot water supply apparatus 100a, a set hot water supply temperature in a hot water supply operation, and heating capacity in a heating operation. The display unit 410 may be configured with a liquid crystal panel. The display unit 410 can visually display an operation state of the heating and hot water supply apparatus 100a and information indicating content of a set operation command. Alternatively, a part or the whole of the operation unit 420 may be configured using a partial area of the display unit 410 configured with a touch panel.

The operation command input to the remote 400 is input to the controller 110. Further, the input temperature Tin and the output temperature Thm of the heating medium, the temperature Tw of the low temperature water, the temperature Th of the high temperature water, and the hot water outlet temperature To which are detected by the temperature sensors 251 to 255 are input. Furthermore, a flow rate detection value Q1 detected by a flow rate sensor 260 is input to the controller 110. In addition, a signal Swa from a side of the heating terminal 300 may be input to the controller 110. For example, the signal Swa includes a signal indicating operation/stop of the heating pump 310.

The controller 110 outputs a signal for controlling the operation and stop of the circulation pump 160, a signal for controlling the opening degree of the distribution valve 150, a signal for controlling the opening degree of the bypass flow rate valve 180, a signal for controlling the opening degree of the flow rate regulation valve 170, and a signal for controlling the amount of heat generated by the combustion burner 120 (for example, a signal for controlling the opening degree of the flow rate control valve 121) so that the heating and hot water supply apparatus 100a is operated according to the operation command. These signals are output from the controller 110 via the interface 115 according to a control processing result of the CPU 111.

Figures 3, 4:
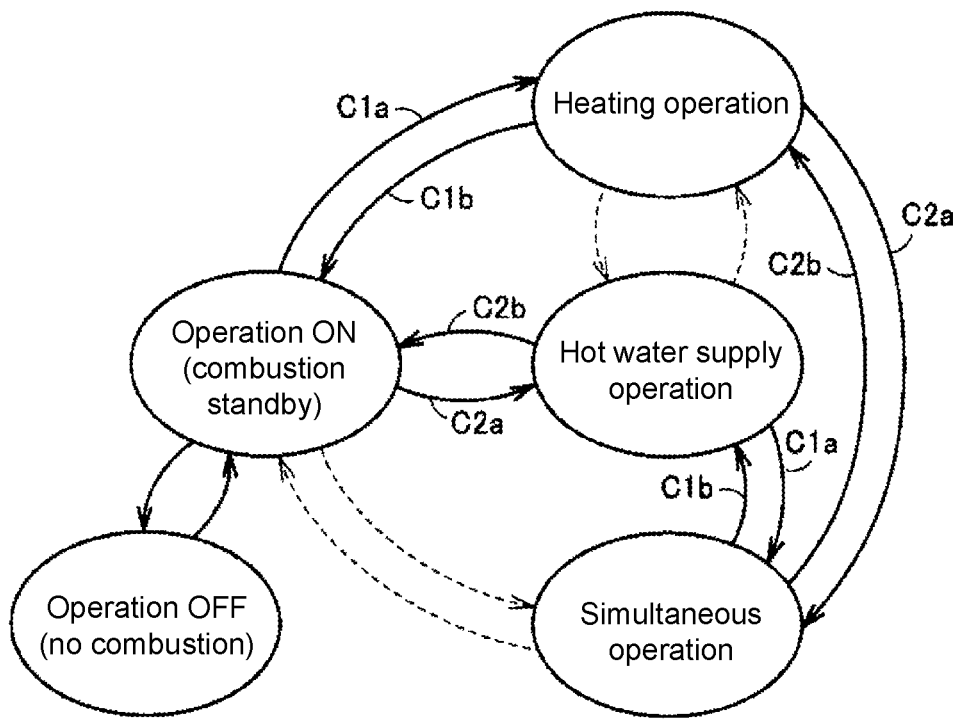
FIG. 3 is a transition diagram of an operation state of the heating and hot water supply apparatus according to the first embodiment.
FIG. 4 is a table illustrating a list of operation states in each operation of the heating and hot water supply apparatus according to the first embodiment.

FIG. 3 illustrates a transition diagram of an operation state of the heating and hot water supply apparatus 100a illustrated in FIG. 1.

Referring to FIG. 3, when an operation switch of the heating and hot water supply apparatus 100a is turned on by the remote 400, the heating and hot water supply apparatus 100a transitions from an operation OFF state to an operation ON state. In the operation ON state, the heating and hot water supply apparatus 100a is powered on, and each device is in an operable state. Combustion in the combustion burner 120 is awaited.

In the operation ON state, when the heating circulation path described with reference to FIG. 1 is formed by the operation of the heating pump 310, the heating and hot water supply apparatus 100a performs the heating operation to supply the heating medium to the heating terminal 300 due to satisfaction of an ON condition C1a of the heating operation.

In the heating operation, the combustion burner 120 is operated in a state in which the heating circulation path is formed, and thus the heating medium flowing through the heat exchanger 130 is heated. Further, the formation of the heating circulation path can be detected on the basis of the signal Swa input to the controller 110.

In the operation of the combustion burner 120, the amount of heat generated by the combustion burner 120 is adjusted to control the output temperature Thm of the heating medium to a target temperature value during the heating operation. In the heating operation, the target temperature value of the heating medium can be set according to a set heating temperature in the heating terminal 300.

When the heating pump 310 is stopped during the heating operation, the heating and hot water supply apparatus 100a returns to the operation ON state due to satisfaction of an OFF condition C1b of the heating operation. Therefore, the combustion burner 120 is stopped.

On the other hand, when the hot water supply tap 350 is opened in the operation ON state, the low temperature water s supplied to the water inlet pipe 206 by the water pressure of the tap water. Therefore, when the flow rate detection value Q1 of the flow rate sensor 260 exceeds a predetermined minimum flow rate, the heating and hot water supply apparatus 100a performs the hot water supply operation for heating the low temperature water by the hot water supply heat exchanger 140 due to satisfaction of an ON condition C2a of the hot water supply operation.

In the hot water supply operation, even when the heating pump 310 is stopped, the bypass path of the heating medium can be formed by operating the circulation pump 160. Therefore, the heating medium heated by the heat exchanger 130 can flow through the primary side path 141 of the hot water supply heat exchanger 140.

Accordingly, the low temperature water introduced into the secondary side path 142 of the hot water supply heat exchanger 140 from the water inlet pipe 206 is heated, and thus the hot water supply from the hot water outlet pipe 210 to the hot water supply tap 350 is allowed. In the hot water supply operation, the mixing ratio of the low temperature water to the high temperature water is controlled by the opening degree of the bypass flow rate valve 180 so that the hot water outlet temperature To (the temperature sensor 255) coincides with the set hot water supply temperature input to the remote 400.

In the hot water supply operation, when the flow rate detection value Q1 of the flow rate sensor 260 becomes smaller than the minimum flow rate due to closing of the hot water supply tap 350, the heating and hot water supply apparatus 100a returns to the operation ON state due to satisfaction of an OFF condition C2b of the hot water supply operation. Therefore, the combustion burner 120 is stopped.

When the ON condition C2a of the hot water supply operation is satisfied again during the heating operation or when the ON condition C1a of the heating operation is satisfied again during the hot water supply operation, the heating and hot water supply apparatus 100a performs a simultaneous operation of hot water supply and heating.

In the simultaneous operation, the heating medium heated by the heat exchanger 130 is distributed to both the heating circulation path (pipe 203) and the bypass path (pipe 204) by the distribution valve 150. Therefore, as the heating medium flows through the heating circulation path, the heating medium is supplied to the heating terminal 300, and the heating medium is also supplied to the primary side path 141 of the hot water supply heat exchanger 140. Even in the simultaneous operation, the hot water outlet temperature To is controlled by the bypass flow rate valve 180 in the same manner as in the hot water supply operation.

During the simultaneous operation, when the OFF condition C1b of the heating operation is satisfied, the heating and hot water supply apparatus 100a transitions to the hot water supply operation. Further, during the simultaneous operation, when the OFF condition C2b of the hot water supply operation is satisfied, the heating and hot water supply apparatus 100a transitions to the heating operation. Furthermore, during the simultaneous operation, when the OFF condition C1b of the heating operation and the OFF condition C2b of the hot water supply operation are simultaneously satisfied, the heating and hot water supply apparatus 100a returns to the operation ON state, and the combustion burner 120 is stopped. Conversely, when the ON condition C1a of the heating operation and the ON condition C2a of the hot water supply operation are simultaneously satisfied in the operation ON state, the heating and hot water supply apparatus 100a can directly transition to the simultaneous operation.

Alternatively, when the ON condition C1a of the heating operation and the OFF condition C2b of the hot water supply operation are simultaneously satisfied during the hot water supply operation, the heating and hot water supply apparatus 100a can directly transition to the heating operation. Conversely, when the ON condition C2a of the hot water supply operation and the OFF condition C1b of the heating operation are simultaneously satisfied during the heating operation, the heating and hot water supply apparatus 100a can directly transition to the hot water supply operation. Further, when the ON condition C1a of the heating operation and the ON condition C2a of the hot water supply operation are simultaneously satisfied in the operation ON state, the heating and hot water supply apparatus 100a can directly transition to the simultaneous operation.

Further, during each of the heating operation, the hot water supply operation and the simultaneous operation, when the operation switch is operated, the heating and hot water supply apparatus 100a stops the combustion burner 120 and directly transitions to the operation OFF state. Even when the operation switch is operated in the operation ON state, the heating and hot water supply apparatus 100a returns to the operation OFF state.

FIG. 4 illustrates a table of a list of operation states in each operation of the heating and hot water supply apparatus 100a according to the first embodiment.

Referring to FIG. 4, in the heating operation, since the heating pump 310 is in operation (ON), the operation (ON) of the circulation pump 160 is basically unnecessary, but it is also possible to further operate the circulation pump 160. In the heating operation, since it is not necessary to supply hot water from the hot water outlet pipe 210, it is not necessary to supply the heating medium to the hot water supply heat exchanger 140, that is, the bypass path. Therefore, the opening degree of the distribution valve 150 is controlled so that the distribution ratio becomes 0 (kd=0) and thus the whole amount of the heating medium heated by the heat exchanger 130 forms the heating circulation path.

In the hot water supply operation, since the heating pump 310 is stopped (OFF), the circulation pump 160 is operated (ON) to pass the heating medium through the bypass path. In the hot water supply operation, since it is unnecessary to supply the heating medium to the heating terminal 300, it is unnecessary to supply the heating medium to the heating circulation path. Therefore, the opening degree of the distribution valve 150 is controlled so that the distribution ratio becomes 1.0 (kd=1.0) and thus the entire amount of the heating medium heated by the heat exchanger 130 forms the bypass path.

In the simultaneous operation, it is necessary to pass the heating medium through both the heating circulation path and the bypass path. Therefore, the opening degree of the distribution valve 150 is set to the predetermined ratio kb. Since 0<kb<1.0, both the supply of the heating medium to the heating terminal 300 and the supply of the heating medium to the hot water supply heat exchanger 140 are realized.

Further, the heating and hot water supply apparatus 100a according to the embodiment further has a function which allows the user to reserve a start time of the hot water supply operation in a timer.

As illustrated with reference to FIG. 2, when the operation switch is turned on, the hot water supply operation is started according to the flow rate of the water inlet pipe 206, but when the hot water supply is started from the bypass path, that is, from a state in which the heating medium does not flow through the hot water supply heat exchanger 140, it may take time to raise the hot water outlet temperature to a set temperature. Meanwhile, even in the case in which the hot water supply operation is not performed, when the heating medium is always supplied to the bypass path, that is, the hot water supply heat exchanger 140, the energy efficiency is lowered.

Accordingly, a timer setting function for a hot water supply start reservation time is provided in the heating and hot water supply apparatus 100a according to the embodiment, and reservation preheat control which causes the heating medium to flow through the hot water supply heat exchanger 140 in advance in response to a hot water supply start time is performed.

Referring again to FIG. 2, with the remote 400, it is possible to set the hot water supply start time on the timer by a user operation of the operation unit 420. The content set by the timer, that is, the hot water supply start reservation time Ttm input by the user, is transmitted to the controller 110.

Figure 5:
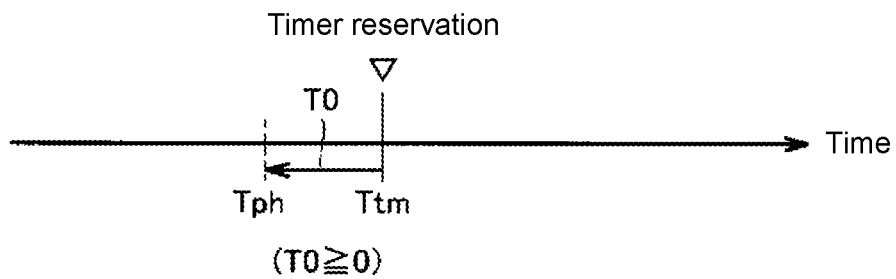
FIG. 5 is a conceptual diagram illustrating time setting relating to timer reservation of a hot water supply operation of the heating and hot water supply apparatus according to the first embodiment.

FIG. 5 illustrates a conceptual diagram for explaining time setting relating to the timer reservation of the hot water supply operation of the heating and hot water supply apparatus according to the first embodiment.

Referring to FIG. 5, a start time Tph (hereinafter, also referred to as a preheating start time Tph) of the reservation preheat control according to the hot water supply start reservation time Ttm set by the timer using the remote 400 is set. For example, the preheating start time Tph is set to a time that is a predetermined time T0 before the hot water supply start reservation time Ttm. Further, the reservation preheat control may be started from the hot water supply start reservation time Ttm by setting T0=0 and Tph=Ttm. That is, in the embodiment, the hot water supply start reservation time Ttm set by the timer may not only be a start time of use of the hot water supply but may include a start time of the reservation preheat control (when T0=0).

As described above, in FIG. 2, the operation unit 420 of the remote 400 corresponds to an embodiment of an "input unit" for inputting a start reservation time of the hot water supply operation, and the controller 110 corresponds to an embodiment of a "control unit."

Figure 6:
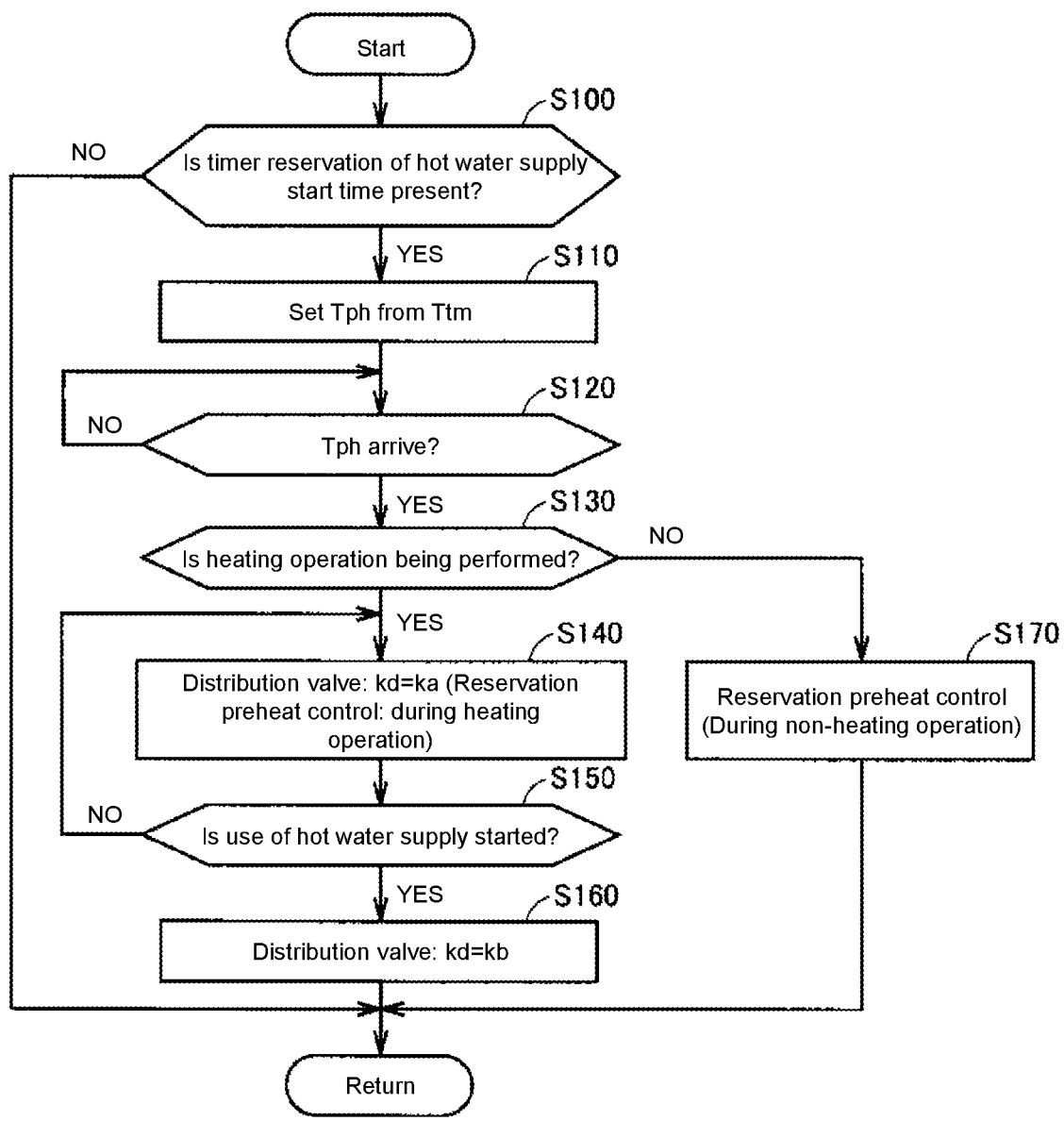
FIG. 6 is a flowchart illustrating a control process for reservation preheat control in the heating and hot water supply apparatus according to the first embodiment.

FIG. 6 is a flowchart illustrating a control process for reservation preheat control in the heating and hot water supply apparatus according to the first embodiment. The control process illustrated in FIG. 6 can be repeatedly performed by, for example, the CPU 111 of the controller 110.

Referring to FIG. 6, in Step S100, the CPU 111 determines whether or not the hot water supply start time is reserved in the timer by the user. For example, when the setting of the hot water supply start reservation time Ttm is transmitted from the remote 400, a YES determination is made in Step S100. On the other hand, when there is no such transmission, in Step S100, a NO determination is made, and subsequent processes are not activated.

When the hot water supply start reservation time Ttm is transmitted from the remote 400 (YES determination in S100), the CPU 111 sets the preheating start time Tph according to the hot water supply start reservation time Ttm in Step S110, as described with reference to FIG. 5.

In Step S120, the CPU 111 determines whether or not the set preheating start time Tph arrives using the clock unit 116. Processes after Step S130 are not activated until the preheating start time Tph arrives (NO determination in S120).

When the preheating start time Tph arrives (YES determination in S120), in step S130, the CPU 111 determines whether or not the heating operation is being performed. During the heating operation (YES determination in S130), the CPU 111 performs the reservation preheat control in Step S140.

Referring again to FIG. 4, in the reservation preheat control during the heating operation, since the heating pump 310 is being operated, the operation of the circulation pump 160 is not indispensable. Meanwhile, the opening degree of the distribution valve 150 is controlled so that a distribution ratio kd becomes the predetermined ratio ka. The ratio ka is set within a range of 0<ka<1.0 to pass the heating medium through both the heating circulation path and the bypass path. Further, the ratio ka is set to a value lower than the ratio kb in consideration of the fact that the hot water supply is not actually being used. That is, in the reservation preheat control during the heating operation, the distribution ratio kr by the distribution valve 150 is controlled to be lower than that during simultaneous operation, that is, the flow rate of the heating medium in the hot water supply heat exchanger 140 is controlled to be small.

Referring again to FIG. 6, after the start of the reservation preheat control (S140), the CPU 111 determines whether or not the use of the hot water supply is started in Step S150. For example, in Step S150, the YES determination is made when the flow rate detected by the flow rate sensor 260 exceeds the minimum flow rate, and the NO determination is kept until that time.

Until the start of the use of the hot water supply is detected (NO determination in S150), the CPU 111 performs the reservation preheat control in step S140. Therefore, in the primary side path 141 of the hot water supply heat exchanger 140, the heating medium flows at a flow rate according to the distribution ratio kd=ka.

When the start of the use of the hot water supply is detected (YES determination in S150), the CPU 111 advances the process to Step S160 and controls the opening degree of the distribution valve 150 so that the distribution ratio kr becomes kb to start the simultaneous operation. After that, the heating and hot water supply apparatus 100a performs the simultaneous operation described in FIGS. 3 and 4.

The preheat control according to the embodiment can also be characterized by the viewpoint that the distribution ratio kd by the distribution valve 150 is different between the heating operation and the non-heating operation. As described above, the distribution ratio kd during the heating operation is set to a value higher than that during the non-heating operation, that is, a supply amount of the heating medium to the bypass path including the hot water supply heat exchanger 140 is set to increase.

At the preheating start time Tph (YES determination in S120), if the heating operation is not being performed (YES determination in S130), the CPU 111 performs the reservation preheat control in Step S170. In this case, as with the hot water supply operation, the circulation pump 160 is operated, and the opening degree of the distribution valve 150 can be controlled so that the distribution ratio kd=1.0 to cause the entire amount of the heating medium to flow through the bypass path.

In the way, the distribution ratio kd=0 during the heating operation corresponds to one embodiment of a "first value," the distribution ratio kr=ka in the reservation preheat control during the heating operation corresponds to one embodiment of a "second value," the distribution ratio kd=kb during the simultaneous operation corresponds to one embodiment of a "third value," and the distribution ratio kd=1.0 during the hot water supply operation corresponds to one embodiment of a "fourth value."

Figure 7:
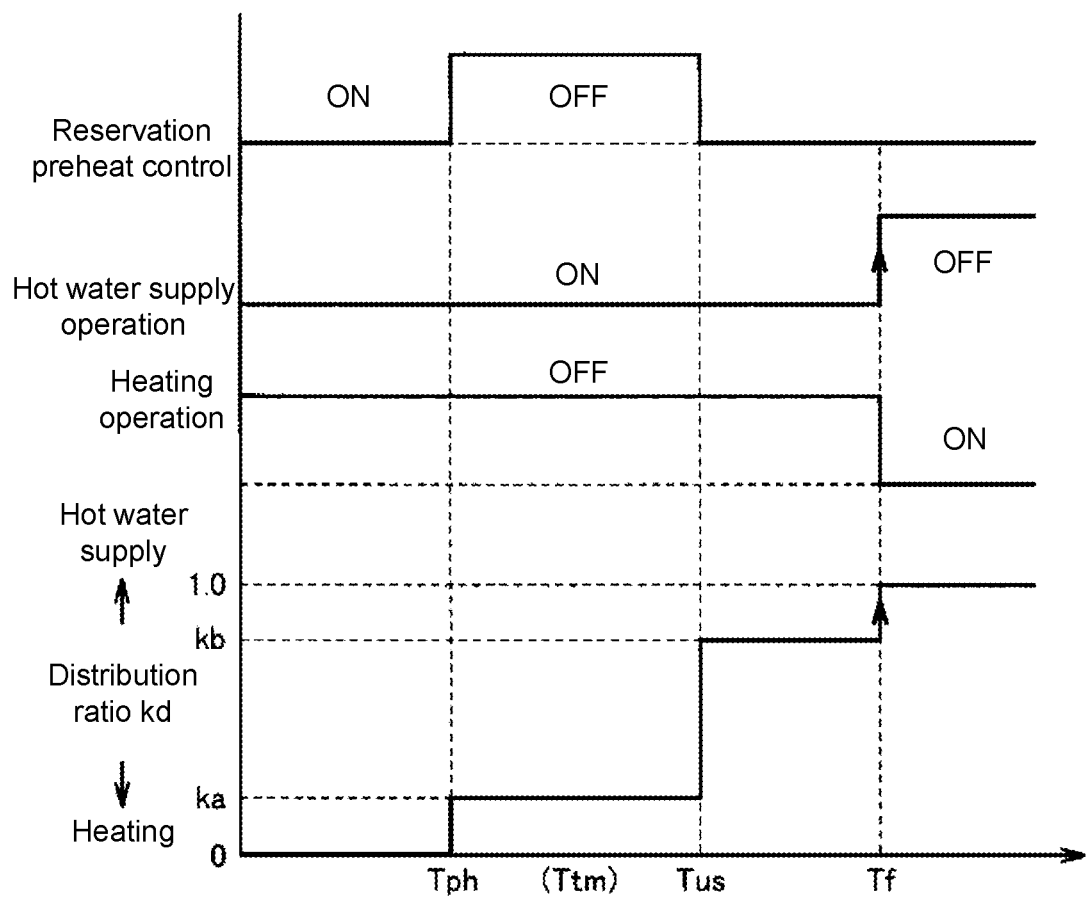
FIG. 7 is an operation waveform diagram when the reservation preheat control is started during a heating operation in the heating and hot water supply apparatus according to the first embodiment.

FIG. 7 illustrates an operation waveform diagram when the reservation preheat control is started during the heating operation in the heating and hot water supply apparatus according to the first embodiment.

Referring to FIG. 7, during the heating operation, the distribution ratio kd=0 is controlled by the distribution valve 150, and the entire amount of the heated heating medium is supplied to the heating terminal 300 by the heating circulation path before the preheating start time Tph.

When the reservation preheat control is started from the preheating start time Tph, the distribution ratio kr by the distribution valve 150 is increased from 0 (first value) to ka (second value) to satisfy both the supply of the heating medium to the heating terminal 300 and the flow of the heating medium to the hot water supply heat exchanger 140 (primary side path 141).

When the use of the hot water supply is started at a time Tus, the distribution ratio kr by the distribution valve 150 is further increased from ka (second value) to kb (third value) for the simultaneous operation of the heating and the hot water supply.

As described above, during the heating operation, when the use of the hot water supply is started after the hot water supply start reservation time Ttm and the process is shifted to the simultaneous operation by setting the preheating start time Tph to a time which is the same as or before the hot water supply start reservation time Ttm set by the timer, it may be understood that the distribution ratio kr by the distribution valve 150 is increased in stages from a value during the heating operation to a value during the simultaneous operation.

Further, at a time Tf, when the heating operation is turned off by an OFF command in the heating terminal 300, the hot water supply operation is performed after the time Tf. In this case, the distribution ratio kr by the distribution valve 150 is further increased (kr=1.0), and the opening degree of the distribution valve 150 is controlled so that the entire amount of the heated heating medium flows through the bypass path.

Figure 8:
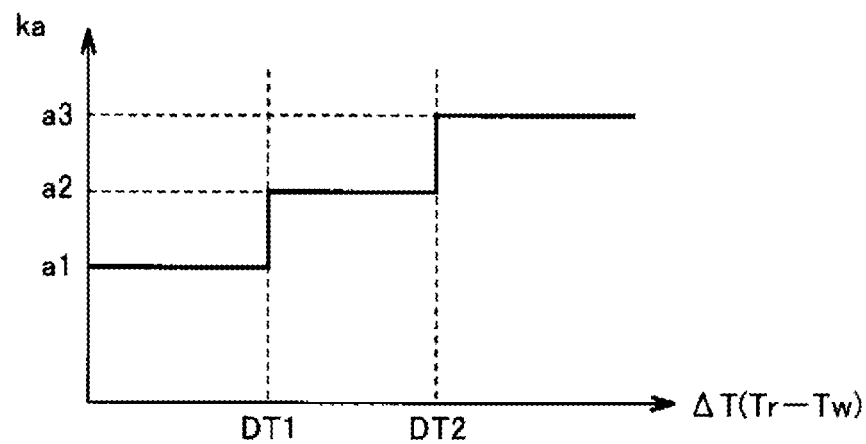
FIG. 8 is a conceptual diagram illustrating variable setting of a distribution ratio in reservation heating control during the heating operation.

Further, as illustrated in FIG. 8, it is also possible to variably set the value (ka) of the distribution ratio in reservation heating control during the heating operation according to the temperature Tw of the low temperature water in the hot water supply path.

A horizontal axis of FIG. 8 illustrates a temperature difference $\Delta T$ between the set hot water supply temperature Tr and the temperature Tw of the low temperature water, and a vertical axis thereof illustrates a set value of the distribution ratio ka in the reservation heating control during the heating operation.

As the temperature Tw of the low temperature water becomes lower and the temperature difference $\Delta T$ becomes higher, the amount of heat received from the hot water supply heat exchanger 140 which is necessary for setting the hot water outlet temperature To to the set hot water supply temperature Tr increases. Accordingly, there is a concern that the increase in the hot water outlet temperature To will be delayed.

Therefore, as the temperature difference $\Delta T$ increases, a flow rate of the heating medium flowing through the hot water supply heat exchanger 140 (primary side path 141) is preferably increased. Therefore, the value ka of the distribution ratio in the reservation heating control during the heating operation is preferably variably set to be higher as the temperature difference $\Delta T$ increases.

For example, as illustrated in FIG. 8, a set value of the distribution ratio ka can be set in a plurality of stages using determination values DT1 and DT2. Specifically, it is possible to set kr=a1 when $\Delta T \leq DT1$, to set kr=a2 when $DT1 < \Delta T \leq DT2$ and to set kr=a3 when $\Delta T > DT2$. Alternatively, the set value of the distribution ratio ka can also be variably set stepwise in two stages or four or more stages. Further, the set value of the distribution ratio ka may be variably and continuously set by setting a function with the temperature difference $\Delta T$ as a variable.

As described above, according to the heating and hot water supply apparatus according to the first embodiment, when the hot water supply is started during the heating operation according to a timer reservation function of the hot water supply start time, it is possible to perform the preheat control to quickly increase the hot water outlet temperature at the start of the hot water supply while minimizing deterioration of the energy efficiency and the heating capacity.

Further, in the control process of FIG. 6, control for a time length of the reservation preheat control may be provided to cope with a case in which the use of the hot water supply is not started even after a long time has elapsed from the hot water supply start reservation time Ttm. For example, when a continuous time of the NO determination in Step S150 reaches a predetermined limit time, the heating and hot water supply apparatus 100a may be controlled to forcibly return to the heating operation.

Second Embodiment

Figure 9:
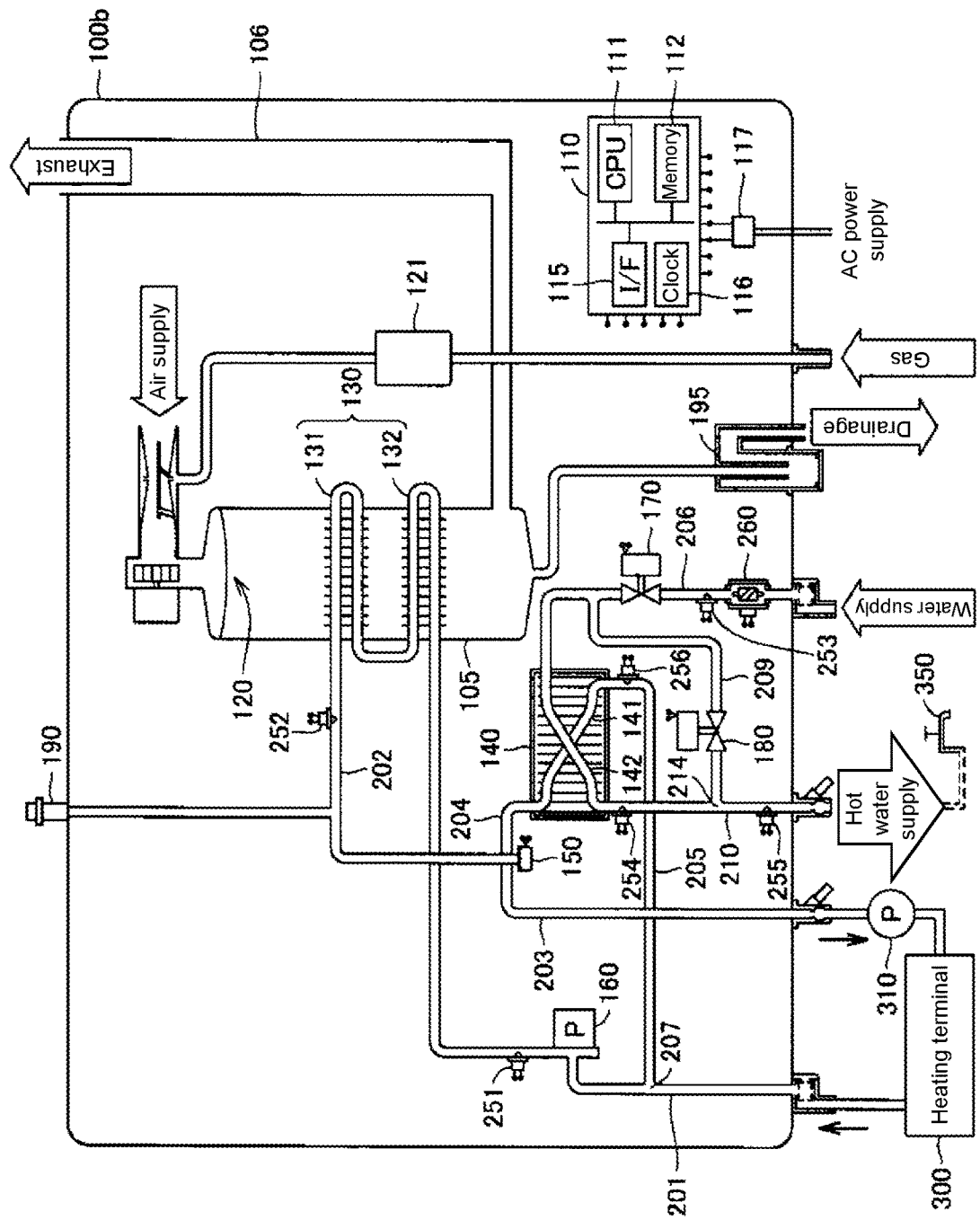
FIG. 9 is a block diagram illustrating a configuration of a heating and hot water supply apparatus according to a second embodiment.

FIG. 9 is a block diagram illustrating a configuration of a heating and hot water supply apparatus 100b according to a second embodiment.

Comparing FIG. 9 with FIG. 1, the heating and hot water supply apparatus 100b according to the second embodiment is different from the heating and hot water supply apparatus 100a according to the first embodiment in that a temperature sensor 256 is further disposed on the output side of the primary side path 141 of the hot water supply heat exchanger 140. Since the configuration of the other parts of the heating and hot water supply apparatus 100b is the same as that of the heating and hot water supply apparatus 100a illustrated in FIG. 1, the detailed description thereof will not be repeated.

In the heating and hot water supply apparatus according to the second embodiment, similarly to FIGS. 2 to 6, the transition of the operation state and the control in each operation mode are performed, and the reservation preheat control is also performed according to the hot water supply start reservation time Ttm input by the timer.

In the heating and hot water supply apparatus 100b, the setting of the distribution ratio during a reservation preheat control period in the heating operation can be more finely controlled using a temperature detected by the temperature sensor 256.

Figure 10:
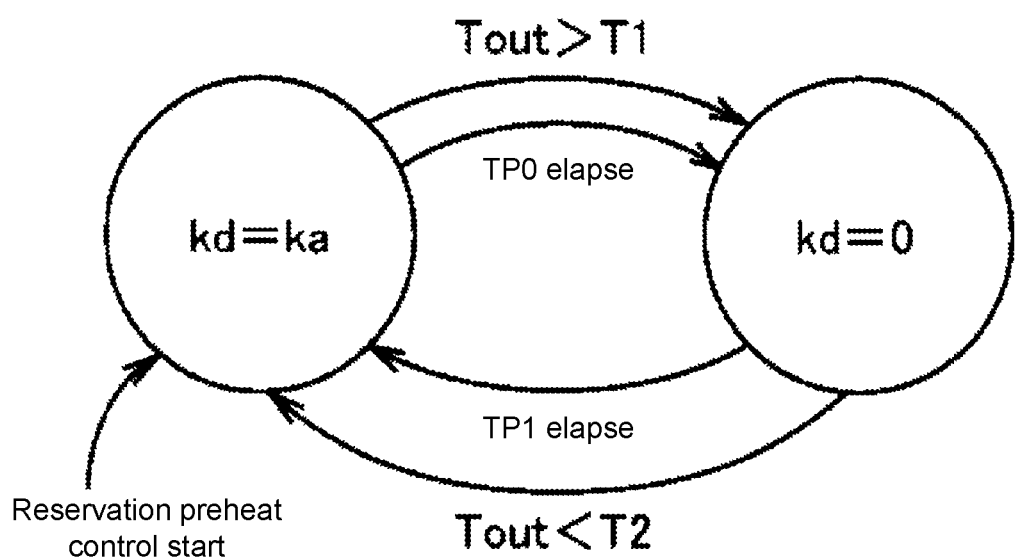
FIG. 10 is a transition diagram illustrating change control of the distribution ratio during a reservation preheat control period in the heating operation of the heating and hot water supply apparatus according to the second embodiment.

FIG. 10 is a transition diagram illustrating change control of the distribution ratio during the reservation preheat control period in the heating operation of the heating and hot water supply apparatus 100b according to the second embodiment.

Referring to FIG. 10, when the YES determination is made in Step S130 in FIG. 6 and the reservation preheat control is started, the distribution ratio kd=ka by the distribution valve 150 is initially set. In this state, an output temperature Tout of the heating medium from the primary side path 141 which is detected by the temperature sensor 256 is compared with a predetermined determination temperature T1.

When the output temperature Tout rises above the determination temperature T1, it is detected by the flow of the heating medium through the bypass path that the primary side path 141 of the hot water supply heat exchanger 140 is filled with the heating medium. Therefore, the distribution ratio kd is lowered to be below ka to prioritize the supply of the heating medium to the heating terminal 300 by the heating operation. For example, like the normal heating operation, the distribution ratio kd=0 can be set.

When the output temperature Tout falls below a predetermined determination temperature T2 (T2<T1) in a state in which the distribution ratio kd is reduced, the opening degree of the distribution valve 150 is controlled such that the distribution ratio kd returns to the set value at the start of the reservation heating control (kd=ka).

Alternatively, it is also possible to change the distribution ratio kd of the distribution valve 150 during the reservation preheat control each time the predetermined time lengths TP1 and TP2 elapse according to the elapsed time. The change control of the distribution ratio kd of the distribution valve 150 illustrated in FIG. 10 is performed in Step S140 of FIG. 6.

According to the heating and hot water supply apparatus of the second embodiment, excessive supply of the heating medium to the hot water supply heat exchanger in the reservation preheat control during the heating operation can be minimized, and the deterioration of the energy efficiency and the heating capacity can be further minimized.

It will be apparent to those skilled in the art that various modifications and variations can be made to the disclosed embodiments without departing from the scope or spirit of the disclosure. In view of the foregoing, it is intended that the disclosure cover modifications and variations provided that they fall within the scope of the following claims and their equivalents.

What is claimed is:

1. A heating and hot water supply apparatus, comprising:
   a heating mechanism configured to heat a heating medium,
   a heating circulation path configured to circulate the heating medium heated by the heating mechanism with a heating terminal when a heating operation is performed,
   a hot water supply heat exchanger having a primary side path and a secondary side path for heat exchange between liquids,
   a bypass path branched from the heating circulation path and configured to join the heating circulation path again after causing the heating medium to flow through the primary side path of the hot water supply heat exchanger without passing through the heating terminal,
   a flow rate control mechanism configured to control a division ratio which is a ratio of a flow rate of the heating medium supplied to the bypass path to a total flow rate of the heating medium heated by the heating mechanism,
   a water inlet pipe connected to an input side of the secondary side path,
   a hot water outlet pipe connected to an output side of the secondary side path,
   an input unit configured to input a start reservation time of a hot water supply operation, and
   a control unit configured to control the flow rate control mechanism according to ON and OFF of the heating operation and the hot water supply operation,
   wherein the control unit controls the flow rate control mechanism to set the division ratio to a first value when only the heating operation is performed and to set the division ratio to a second value greater than the first value when a preheating start time set according to the start reservation time arrives during performance of only the heating operation, and
   the control unit also controls the flow rate control mechanism to set the division ratio to a third value greater than the second value during a simultaneous operation of the heating operation and the hot water supply operation and to set the division ratio to a fourth value greater than the third value when only the hot water supply operation is performed.

2. The heating and hot water supply apparatus according to claim 1, further comprising:
   a first temperature sensor provided in the water inlet pipe,
   wherein the control unit increases the second value as a temperature difference between a set hot water supply temperature in the hot water supply operation and a detected temperature of the first temperature sensor increases.

3. The heating and hot water supply apparatus according to claim 2, further comprising:
   a second temperature sensor disposed on the output side of the primary side path of the hot water supply heat exchanger in the bypass path,
   wherein the control unit reduces the division ratio to be lower than the second value when a detected temperature of the second temperature sensor becomes higher than a predetermined determination temperature under a condition that the division ratio is the second value.

4. The heating and hot water supply apparatus according to claim 1, further comprising:
   a first temperature sensor disposed on the output side of the primary side path of the hot water supply heat exchanger in the bypass path,
   wherein the control unit reduces the division ratio to be lower than the second value when a detected temperature of the first temperature sensor becomes higher than a predetermined determination temperature under a condition that the division ratio is the second value.

5. A method of controlling a heating and hot water supply apparatus which comprises a heating circulation path configured to circulate a heating medium heated by a heating mechanism with a heating terminal, and a hot water supply heat exchanger disposed in a bypass path branched from the heating circulation path and configured to join the heating circulation path again without passing through the heating terminal, the method comprising:
   receiving an input of a start reservation time of a hot water supply operation, and
   increasing a division ratio in stages when use of hot water supply is started after the start reservation time during a heating operation in which the division ratio of the heating medium from the heating circulation path to the bypass path is set to a first value.

6. The method according to claim 5, wherein the increasing of the division ratio comprises:
   increasing the division ratio from the first value to a second value when a preheating start time set according to the start reservation time arrives, and
   increasing the division ratio from the second value to a third value according to start of use of hot water supply.

* * * * *